T. P. BORDEN.
TIRE VALVE.
APPLICATION FILED NOV. 28, 1914. RENEWED FEB. 8, 1916.
1,177,299. Patented Mar. 28, 1916.
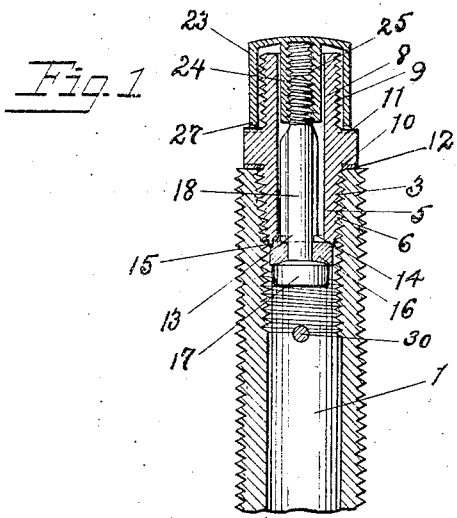
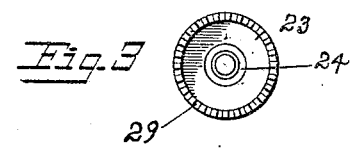
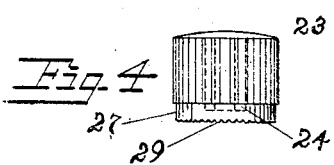
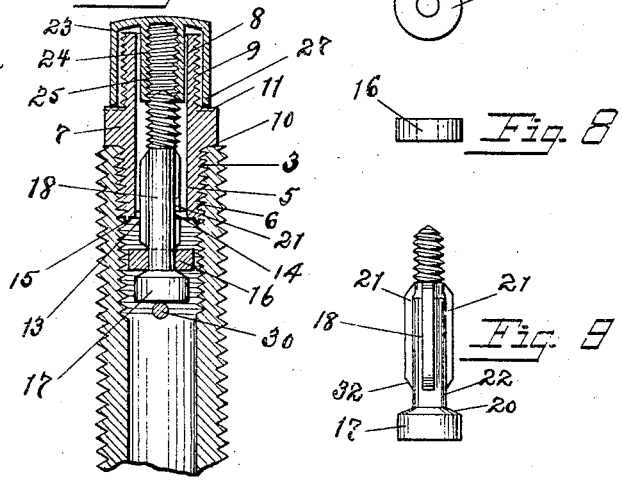
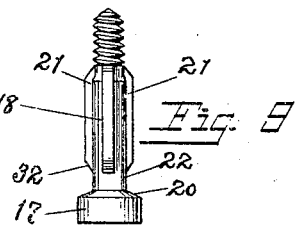
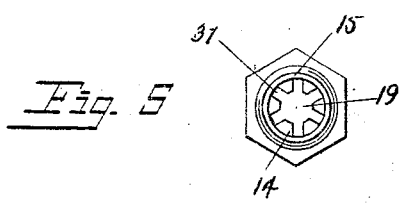
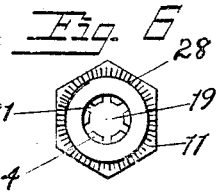
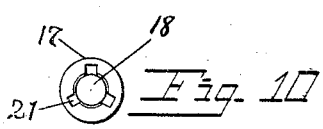
Witnesses
Russel N. Low
J. S. Barker
Inventor
Thomas P. Borden
By
N. N. Low
Attorney

UNITED STATES PATENT OFFICE.

THOMAS P. BORDEN, OF NEW YORK, N. Y., ASSIGNOR TO ROLLIE BORDEN LOW, OF NEW YORK, N. Y.

TIRE-VALVE.

1,177,299.  Specification of Letters Patent.  Patented Mar. 28, 1916.

Application filed November 28, 1914, Serial No. 374,554. Renewed February 8, 1916. Serial No. 77,030.

*To all whom it may concern:*

Be it known that I, THOMAS P. BORDEN, a citizen of the United States, residing at New York, in the county of New York and State of New York, have invented certain new and useful Improvements in Tire-Valves, of which the following is a specification.

My invention relates to improvements in pneumatic valves for vehicle tires, in which the valve is or may be contained within a nipple or tube which is distinct and separable from the ordinary air tube, the latter being the tube which is fixedly attached to the tire, or the inner tube of the same; whereby such nipple, with the valve and its related parts, may be removed from the fixed air tube for adjustment or repair of the valve, without the necessity of removing the inner tube from the wheel or separating the air tube from the tire.

The invention relates further to that class of valves in which the sealing pressure is not dependent upon the air pressure within the tire, but is positively applied to the valve to force it, in the same direction as the air pressure, against its valve seat. This mechanical valve sealing pressure is applied by means of a screw threaded cap which abuts against the outer part of the nipple, or a shoulder thereof, and engages the valve stem by its screw thread, whereby the turning of the cap draws the valve outward to its seat. Such action is important for making the valve completely air tight. When air pressure alone is relied upon to seal the valve the talcum or other dust from within the inner tube of the tire is inevitably blown outward from time to time so as to lodge between the valve and its seat, and prevent the air tight closing of the valve and leave a slow leak.

It is the object of my improvements, among other things, to provide means for holding the valve stem from rotation during the mechanical closing of the valve, to secure the rubber or other soft valve packing removably in place on the valve and to construct the valve and seat so that the packing will be compressed to the best advantage for the perfection of its sealing action.

With these objects in view my invention consists in the parts and combinations thereof hereinafter set forth and claimed.

It also consists in all other new features of improvement which may be found to be comprised in the structure of the said valve and co-acting parts.

In order to make the invention more clearly understood I have shown in the accompanying drawing means for carrying the same into practical effect, without limiting the improvements in their useful application, to the particular construction which, for the purpose of explanation, I have illustrated.

In the said drawings: Figure 1 is a longitudinal sectional view of the tire valve and a portion of the air tube, the valve being shown as closed. Fig. 2 is a similar view, the valve being shown as open. Fig. 3 is a bottom end view of the cap. Fig. 4 is a side view of the same. Fig. 5 is a bottom end view of the nipple. Fig. 6 is a top plan view of the nipple. Fig. 7 is a plan view of the valve packing. Fig. 8 is a side view of the same. Fig. 9 is a side view of the valve and stem without the packing. Fig. 10 is a top plan view of said valve and stem.

Referring to the drawings, 1 indicates the air tube which is clamped or otherwise secured to the inner tire tube (not shown), this air tube being externally screw threaded for the usual nut by which it may be clamped to the wheel rim, and preferably flattened so that it may be held from turning. The air tube is internally screw threaded at its outer end as indicated at 3 so that the nipple 4 may be screwed into the same by its inner externally screw threaded member 5. For this purpose the member 5 is provided with a conical or slightly tapered screw thread 6, and the screw thread 3 is correspondingly tapered outwardly, whereby the nipple may be screwed into place in the air tube with a wedging action so as to form an air tight joint. Above or at the outer side of the member 5 the nipple is formed with an enlargement 7 which is externally flattened or nut shaped so that it may be turned by a wrench. At the outer side of the enlargement 7 the nipple is formed with an extension 8 having an external screw thread 9 for the attachment of an air pump coupling or tube. By the enlargement 7 the nipple is provided with an internal shoulder 10 which is normally screwed tightly against the outer end of the air tube, and with an external shoulder 11. A soft rubber or other packing 12 may be applied between the shoulder 10 and the air tube, but this is not ordinarily necessary. At the inner end the nipple is formed on its under or inner side with a valve seat 13. This seat may consist of the annular end of the member 5, but is preferably formed by a circular projection or rim 15 to engage and be indented in, or to circumferentially confine, the valve packing 16. The nipple is formed with inward projections 14 arranged at or near the valve seat, between which projections are formed spaces or grooves 31.

The valve proper is shown at 17, consisting of a metallic head attached to a stem 18, the latter extending within the nipple through a space 19 between the ends of the projections 14. The outer face of the valve 17 is made slightly conical, as shown at 20, so as to spread the packing 16, which is preferably of soft rubber, outward into engagement with the rim 15. The stem 18 is provided with one or more fins or ribs 21, preferably three in number equally separated around the stem, whereby the stem is centered and its outer free end kept substantially in the middle of the nipple. This enables the stem to be readily engaged by the cap as hereinafter described. The fins 21 do not extend to the valve 17 but terminate a little above the same, so as to leave a space 22 to hold the packing 16, the inner ends of the fins 21 serving as shoulders 32 to prevent the outward movement of the packing. But the packing being of soft material may be forced on to the valve stem and over the fins to its place on the outer face of the valve, and may be removed and renewed in the same manner.

23 is the cap formed to fit over the outer end of the nipple extension 8. It is formed with a central inwardly extending tube 24 which is internally screw threaded at 25 to engage a corresponding external thread on the stem 18, and with an annular flange 27 which excludes dust from the air passage and abuts against the shoulder 11 of the nipple to draw the valve and packing 16 tightly against the valve seat. The said shoulder 11 is formed with small angular teeth 28 which extend substantially radially, and are engaged by corresponding teeth 29 on the inner end of the flange 27, whereby the cap is prevented from unscrewing excepting when it is intentionally and forcibly turned by the operator.

30 is a pin or shoulder on the inner face of the air tube which holds the valve near to its seat and maintains the fins in engagement in the grooves 31 when the valve stem is released from the nipple, but allows the valve to drop sufficiently away from the same to admit air when the tire is being pumped up. After the tire is filled the internal air pressure temporarily closes the valve, after which the valve is made air tight by the cap as above explained. The projections 14 constitute a means, together with the fins 21, for preventing the rotation of the valve stem, having formed between them said grooves 31 in which the said fins fit in such manner as to allow of the longitudinal play of the stem. These grooves are more than three in number, to allow free passage of air into or from the tire tube when the valve is open.

While the described valve is a perfect air seal when closed, it permits very rapid passage of air, and a quick operation in pumping up or deflating the tire. By providing the valve stem with more than one or two fins, that is to say by arranging the fins polygonally, the free end of the valve stem is centered and no difficulty is experienced in catching it with the cap to seal the valve.

What I claim is:

1. In a valve for tires the combination, of a nipple adapted for separate attachment to an air tube, the said nipple being formed at its inner end with inward projections having between them grooves 31 and a valve seat, a valve having a stem extending past the said projections into the interior of the nipple, the said stem having fins 21 provided with shoulders 32 at a distance from the face of the valve, a packing on the face of the valve retained by the said shoulders, and a cap bearing against an outer part of the nipple and having a screw thread engaging the valve stem, substantially as specified.

2. In a valve for tires the combination, of a nipple adapted for separable attachment to an air tube, the said nipple being formed at its inner end with a valve seat and having an external shoulder formed with teeth 28, a valve having a stem extending through the valve seat into the interior of the nipple, the said stem having a screw thread, a soft elastic packing on the face of the valve, means for preventing the rotation of the valve stem, and a cap having teeth 29 bearing against the said teeth 28 and having a screw thread engaging the valve stem, substantially as specified.

3. In a valve for tires the combination, of a nipple adapted for separate attachment to and removal from an air tube, the said nipple being formed on the interior of its inner end with inward projections having grooves between them, and formed on its inner end with a valve seat; a valve having a screw threaded stem extending past the said projections into the interior of the nipple; the said stem having fins adapted to engage in the said grooves; a packing on the face of the valve opposite to the said valve seat; a cap bearing against the outer part of the nipple and having a screw thread engaging the valve stem; and means which maintain the engagement of the fins in said grooves when the valve stem is released from the nipple; substantially as specified.

In testimony whereof I affix my signature in presence of two witnesses.

THOMAS P. BORDEN.

Witnesses:
H. N. Low,
N. Curtis Lammond.